US005731844A

United States Patent [19]
Rauch et al.

[11] Patent Number: 5,731,844
[45] Date of Patent: Mar. 24, 1998

[54] TELEVISION SCHEDULING SYSTEM FOR DISPLAYING A GRID REPRESENTING SCHEDULED LAYOUT AND SELECTING A PROGRAMMING PARAMETER FOR DISPLAY OR RECORDING

[75] Inventors: Adam Christopher Rauch, Seattle; Gregory Riker, Woodinville; Nathan Paul Myhrvold, Bellevue; Edwin Thorne, III, Seattle, all of Wash.

[73] Assignee: Microsoft Corporation, Redmond, Wash.

[21] Appl. No.: 713,588

[22] Filed: Aug. 13, 1996

Related U.S. Application Data

[63] Continuation of Ser. No. 241,743, May 12, 1994, abandoned.

[51] Int. Cl.$^6$ .................................................. H04N 5/445
[52] U.S. Cl. ........................ 348/563; 348/565; 348/564; 348/10; 348/903; 348/569; 395/326
[58] Field of Search ................ 348/6, 7, 10, 12, 348/13, 906, 553, 563, 564, 565, 566, 567, 568, 569, 570, 731, 732, 460, 473, 734; 395/326, 327, 328; 455/3.1, 3.2, 4.1, 425.1, 26.1; 358/335; 360/14.1, 69; 359/142, 146; H04N 5/54, 5/445

[56] References Cited

U.S. PATENT DOCUMENTS 5,130,800  7/1992  Johnson et al. ...................... 348/564

FOREIGN PATENT DOCUMENTS

| 0 444 496 | 9/1991 | European Pat. Off. ....... H04N 5/445 |
| 0 447 968 | 9/1991 | European Pat. Off. ....... H04N 7/087 |
| 0 488 379 | 6/1992 | European Pat. Off. ....... H04N 5/455 |
| 61-049574 | 3/1986 | Japan ............................. H04N 7/00 |
| 2 208 142 | 3/1989 | United Kingdom ........... H04N 5/76 |
| WO 91/05436 | 4/1991 | WIPO ............................. H04N 5/44 |

OTHER PUBLICATIONS

Brugliera, V., "Digital On–Screen Display A New Technology for the Consumer Interface", *Cable TV Sessions* 18:571–586, 1993.

Anonymous, "PC–Controlled Videotext Decoder PC –VT7000", *Elektor Electronics* 16:22–26, 1990.

The FroxSystem Home Theater, "1993 Corporate Overview, Product Description Guide and Marketing Summary", Frox, Inc., Milpitas, California, 1993, pp. i–16.

Frox, "The First Vision of the Inevitable", Frox Incorporated, Sunnyvale, California, 1991, pp. 1–12.

"FroxSystem Owner's Manual", Frox, Inc., Sunnyvale, California, 1993, pp. ii–4.7.

Blissmer, Robert H., "Television Takes a New Shape (Smart Television) (Parts of a Special Supplement On Next–Generation Computing)", *Electronic Engineering Times*, May 1992, n693:C47(1).

"Frox Unveils New Home THX Audio Processing Package at the Summer Consumer Electronics Show", *PR Newswire-(PRN)*, Chicago, May 1992.

(List continued on next page.)

*Primary Examiner*—John K. Peng
*Assistant Examiner*—Nathan J. Flynn
*Attorney, Agent, or Firm*—Seed and Berry LLP

[57] ABSTRACT

A computer method and system for providing a user with efficient selection of a television program to view or record. The method provides concurrent display of a television schedule with a graphic description and a textual description of the television program currently selected by the user from the displayed television schedule. The displayed television schedule comprises a schedule layout displayed to the user on a screen display. The schedule layout includes a number of program names arranged in an adaptively learned order based on the frequency of the user's previous selections. Each time a program name is selected by the user, the graphic description and the textual description of the television program represented by the selected program name are displayed concurrently with the adaptively ordered schedule layout. Thus, the user can select a television program perceptively and without delay.

34 Claims, 8 Drawing Sheets

OTHER PUBLICATIONS

"CES: Frox Interactive Home Theatre Rivals HDTV", *Newsbytes News Network (NBNN)*, Las Vegas, Jan. 1992.

"Frox Inc. and Lucasfilm's THX Audio Division Announce Home License Agreement", *PR Newswire (PRN)*, Las Vegas, Jan. 1992.

Rosenthal, Steve, "Smoothing the Way for Video Images", *MacWEEK (MACW)*, Costal Associates Publishing L.P., Jul. 1991, p. 36.

Langburg, Mike, "Making Life Easier: On–Screen TV Listings", *San Jose Mercury News* (2):1D, May 4, 1992.

Langburg, Mike, "The Big Picture: Linking TV, Computer Creates Home Theater", *San Jose Mercury News* (2):1F, Dec. 1, 1991.

5,731,844

TELEVISION SCHEDULING SYSTEM FOR DISPLAYING A GRID REPRESENTING SCHEDULED LAYOUT AND SELECTING A PROGRAMMING PARAMETER FOR DISPLAY OR RECORDING

CROSS-REFERENCE TO RELATED APPLICATION

This application is a file wrapper continuation of U.S. Pat. No. 08/241,743, filed May 12, 1994, now abandoned.

TECHNICAL FIELD

The present invention relates to the field of computer systems and, more particularly, to television program selection using a computer system.

BACKGROUND OF THE INVENTION

A television viewer often considers a number of different television programs before deciding on a program to view or record. Before making such a decision, the viewer typically engages in a cumbersome and time-consuming process in considering the different television programs with reference to a printed television schedule. The viewer first considers a program by referring to the printed schedule to obtain a time and channel over which the program will be broadcast. The program may be included anywhere within the schedule, and thus some effort may be required of the user and some time may be wasted in locating the program. Where provided, the viewer also reads a text description of the program in the printed schedule or in another publication. The text description may also require time and effort to locate. The viewer then considers the program based on the text description. If the program is currently being broadcast, the viewer may further consider the program by selecting the channel indicated by the printed schedule to momentarily view the program.

When the viewer wishes to consider a number of programs, the above decision process becomes particularly cumbersome and time-consuming. The viewer considers a first program as described above, determining the location of the first program in the printed television schedule, determining the location of and reading the text description of the first program and, if currently being broadcast, perhaps momentarily viewing the first program. The viewer then considers a second program by determining the location of the second program in the printed schedule, determining the location of and reading the text description of the second program and perhaps momentarily viewing the second program. This process is continued for each television program the viewer considers.

One prior art attempt at improving the selection process described above involves a method which actually displays the television schedule on the television screen. By localizing the television schedule and text description to the television, this method renders the user's selection process less awkward than the method described above. Unfortunately, however, this method is still quite cumbersome and time-consuming. When deciding on a program to view or record, the viewer considers a first program by determining the location of a first program name in the displayed television schedule and then designating the program name via a remote control pointing device. A text description is then displayed to the viewer in a display window superimposed upon the displayed television schedule.

After the viewer has read the text description, the viewer must remove the display window using the pointing device. The user then selects the first program for viewing if momentary viewing of the first program is desired. After momentary viewing, the user designates the schedule to be displayed again with the device. To continue, the user must then determine the location of a second program name in the television schedule, designate the second program name, read a second text description of the second program in a display window superimposed on the television schedule, remove the display window, select the second program for viewing, designate the schedule to be again displayed, and so on. This entire process must be repeated for each program that the user considers. Thus, a more efficient means of television program selection is desired.

SUMMARY OF THE INVENTION

The present invention is a computer method and system for providing a user with efficient selection of a television program to view or record. The method provides a television schedule which is consistently displayed concurrently with a description of the program currently selected by the user from the displayed television schedule. The description of the program includes both a textual description and a graphic description. The graphic description including a bitmap or a video presentation of the selected program. The displayed television schedule comprises a schedule layout displayed to the user on a screen display. The schedule layout includes a number of program names arranged in an adaptively learned order based on the frequency of the user's previous selections. Each time a program name is selected by the user, the graphic description and the textual description of the television program represented by the selected program name are displayed concurrently with the schedule layout in a separate location on the screen display. As a result of the concurrent display of program names, the user can select a television program perceptively by viewing the adaptively ordered schedule layout at the same time as both the textual and graphic description. Also, as a result of the concurrent display, the user's selection is unencumbered by any delay when the description of each selected program is displayed. Because the television schedule is arranged in an adaptively learned order, the user's selection is likely to be even more efficient. Thus, the user can rapidly select and view the descriptions of a number of television programs when making a decision.

In a preferred embodiment of the invention, a computer obtains the program name and the description of each of a number of television programs from a cable source which broadcasts the television program over cable. The computer also obtains from the cable source a time of broadcast of each television program and a channel indicator indicating the channel over which each television program is to be broadcast. The computer stores the program name, a channel indicator, including a channel name and a channel number, a time of broadcast, including a day, start time, and end time of the broadcast, and a description of each television program, in an entry in a program table provided for that television program. Upon a request by the user, the computer displays the program name, channel indicator and time of broadcast in the schedule layout in a fashion which visually associates the program name with the channel indicator and time of broadcast. Preferably, the schedule layout includes a grid containing one of the program names in each entry. The grid has a channel axis for referencing the channel indicators and a time axis for referencing the corresponding times of each of the scheduled television programs. The order of entries along the channel axis is based on the frequency of user selections of each of the channels.

The computer provides the description of each currently selected program to the television for concurrent display with the schedule layout. The description provided for each television program includes a text string stored by the computer which describes the television program. The computer provides the text string describing a television program to the television for display when the program name of the television program is designated in the grid by the user via an input device such as a remote control. The description provided for each television program also includes a picture-in-graphics display window. A picture-in-graphics display window is similar to a picture-in-picture display window except that the reduced-size picture is displayed in a display window superimposed on a computer graphics background. If the program is currently being broadcast, the computer provides to the television to display in the picture-in-graphics display window the program currently being broadcast. Otherwise, the computer controls the television to display a blank window, or, in an alternative embodiment, a bitmap for the network or television program indicated by the bitmap indicator. The bitmap is provided by the cable source. When a program has been selected for viewing as described above, the selected program is displayed in full screen in place of the schedule layout. Thereafter, when the user changes channels, the program name, channel indicator and text string are displayed superimposed on the program displayed in a corner of the screen.

The computer system of the preferred embodiment also includes a video recorder. The computer controls the video recorder to record a television program when it is broadcast if the television program has been previously selected by the user to be recorded. In the preferred embodiment, the computer can control the video recorder to record the television program even when the television is not "ON". The user selects a program to be recorded by selecting the program name of the program from the schedule layout. When the time of broadcast of the selected television program is reached, the computer briefly displays the text string describing the selected program and then controls the video recorder to record the selected program.

In the preferred embodiment, the user can also select a television program to view or record with reference to a specific topic which defines the nature of the television program. The computer provides to the television for display a list of topics. Each topic corresponds to a set of the scheduled television programs fitting the category described by the topic, such as movies, sports, and so forth. The topic list is displayed in an adaptively learned order based on the number of television programs previously selected from each topic. For example, if movies have been selected most frequently, then a "movies" topic is displayed first in the topic list.

The user then designates a topic from the topic list via the input device. When the topic is designated, the computer provides to the television for display a program list which lists the program names of the television programs defined by the selected topic. The user selects a television program to view or record by designating a program name in the displayed program list via the input device. The computer updates and stores the number of television programs selected for each topic. When the topic list is thereafter displayed, the topics are displayed in an order based on the updated number of television programs selected for each topic.

DETAILED DESCRIPTION OF THE INVENTION

The preferred embodiment of the present invention provides a computer method and system for providing a user with efficient selection of television programs to view and record. The system layout and component interrelationship of the preferred embodiment will be described first, followed by a detailed description of the processes that are performed on the system.

System Overview

Figure 1:
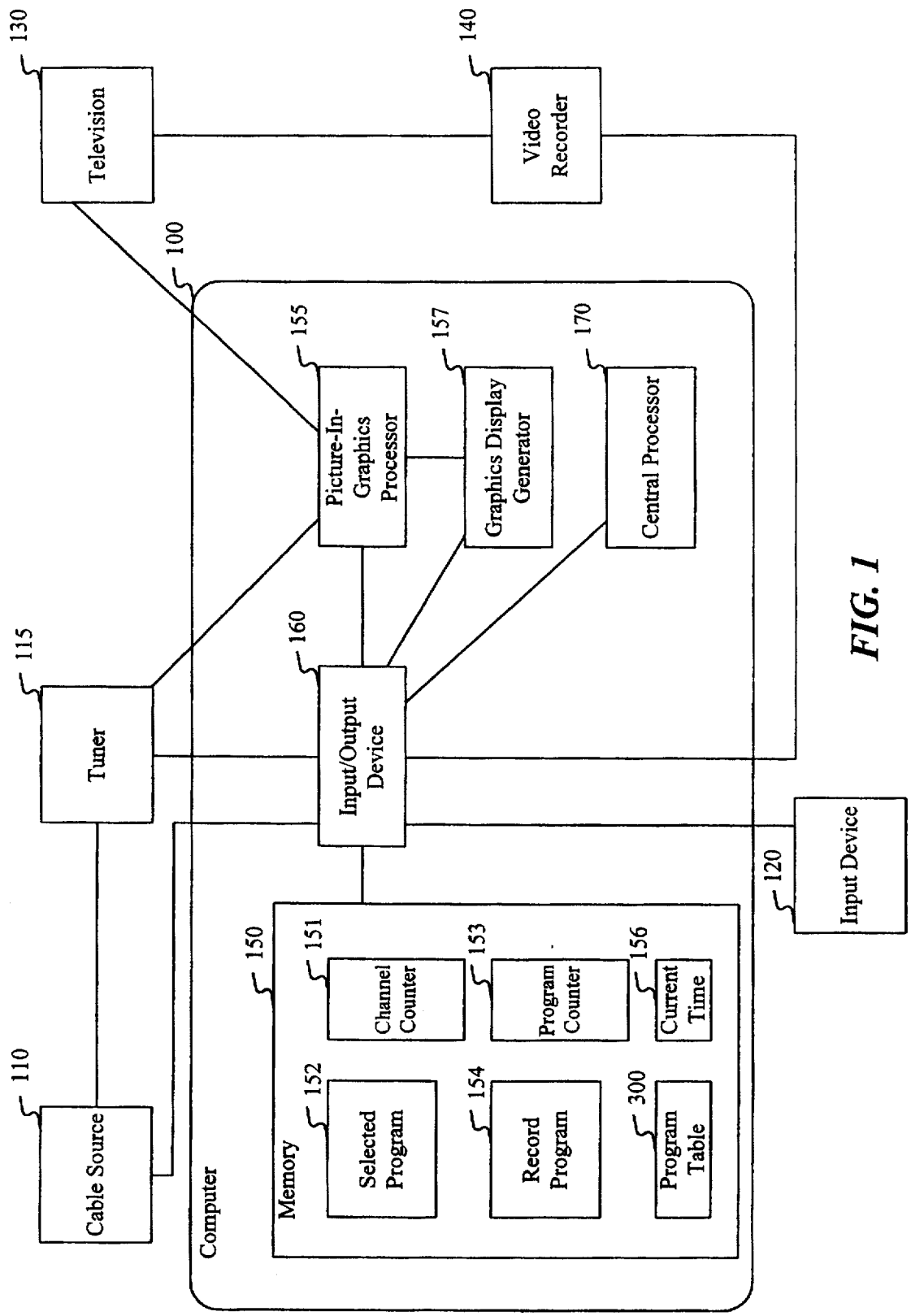
FIG. 1 is a block diagram of the computer system of the preferred embodiment of the invention.

A block diagram of the computer system of the preferred embodiment is shown in FIG. 1. The computer system of FIG. 1 includes a computer 100 which is connected to a cable source 110, a tuner 115, an input device 120, a television 130 and a video recorder 140. In a preferred embodiment, the cable source 110 is a broad band coaxial cable over which a television cable provider sends television programs in a broadcast signal and television program information in a digital data stream. In alternate embodiments, the programs may be broadcast over other media such as a standard television broadcast, direct broadcast via satellite, and so forth. As will be explained, the user utilizes the computer 100 via the input device 120 to select a television program broadcast by the cable source 110. The input device 120 is a mouse, a remote control pointing device, or the like. The cable source 110 and the computer 100 control the tuner, or alternatively the tuner and the video recorder 140, to control the display of the selected television program on the television 130. The computer also controls the video recorder 140 to control the recording of the selected television program.

Specifically, the computer 100 contains a memory 150 which stores a selection computer program 152. It should be noted that the memory 150 includes random access memory (RAM) in which data is stored by programs. As will be explained below, the selection program 152 allows the user to select the desired television programs. The computer 100 also contains a graphics display generator 157 that generates computer graphics, and a picture-in-graphics processor 155 that combines an output from both the tuner 115 and the graphics display generator 157 and sends the resulting signal to the television 130. The memory 150 is connected via an I/O unit 160 to a central processing unit (CPU) 170 which executes the selection program 152. The CPU 170 is also connected to the cable source 110, the tuner 115, the input device 120, the television 130 and the video recorder 140 via the I/O unit 160. When the CPU 170 executes the selection program 152, the CPU 170 obtains the television program information from the cable source 110 in a digital data stream. The program information includes information about a number of television programs. The CPU 170 then stores the program information in the RAM portion of the memory 150.

The program information includes a program name, time of broadcast, channel indicator, and description of each television program. In an alternative embodiment, the program information includes actor names, director names, content ratings such as "R," "PG," etc., and star ratings indicating quality. One of ordinary skill in the art will recognize that the principles of the invention can be applied to maintain a variety of other kinds of program information, as well. The selection program 152 provides the program information to the television 130 via the picture-in-graphics processor 155 in a schedule layout which the television 130 displays. The selection program 152 thereafter obtains from the user via the input device 120 a selection of a television program to display or record by using the schedule layout. The selection program 152 provides the description of the selected program concurrently with the schedule layout to the graphics display generator 157 to be displayed on the television 130. When the user requests to view the selected program, the selection program 152 controls the tuner 115 to tune the selected program, generates a graphics image of the schedule layout and graphics portions by controlling the graphics display generator 157, and instructs the picture-in-graphics processor 155 to combine the video information and graphics image and to send the resulting signal to the television 130. In cases where the schedule layout and portions of the description are combined with a reduced size picture-in-graphics display of the selected program, the selection program 152 instructs the picture-in-graphics processor 155 to overlay the digital image of the broadcast signal obtained from the cable source 110 with a computer graphics image of the schedule layout and graphic portions. The picture-in-graphics processor 155 sends the composite image to the television 130 to be displayed. When the user requests to record the selected program, the selection program 152 designates the program to be recorded. A record program 154 stored in the memory 150 is executed by the CPU 170 concurrently with the selection program. The record program provides a command to the video recorder 140 via the I/O device 160 to record the designated program at the time of broadcast of the selected program. In the preferred embodiment, the command is an infrared command.

Figure 2:
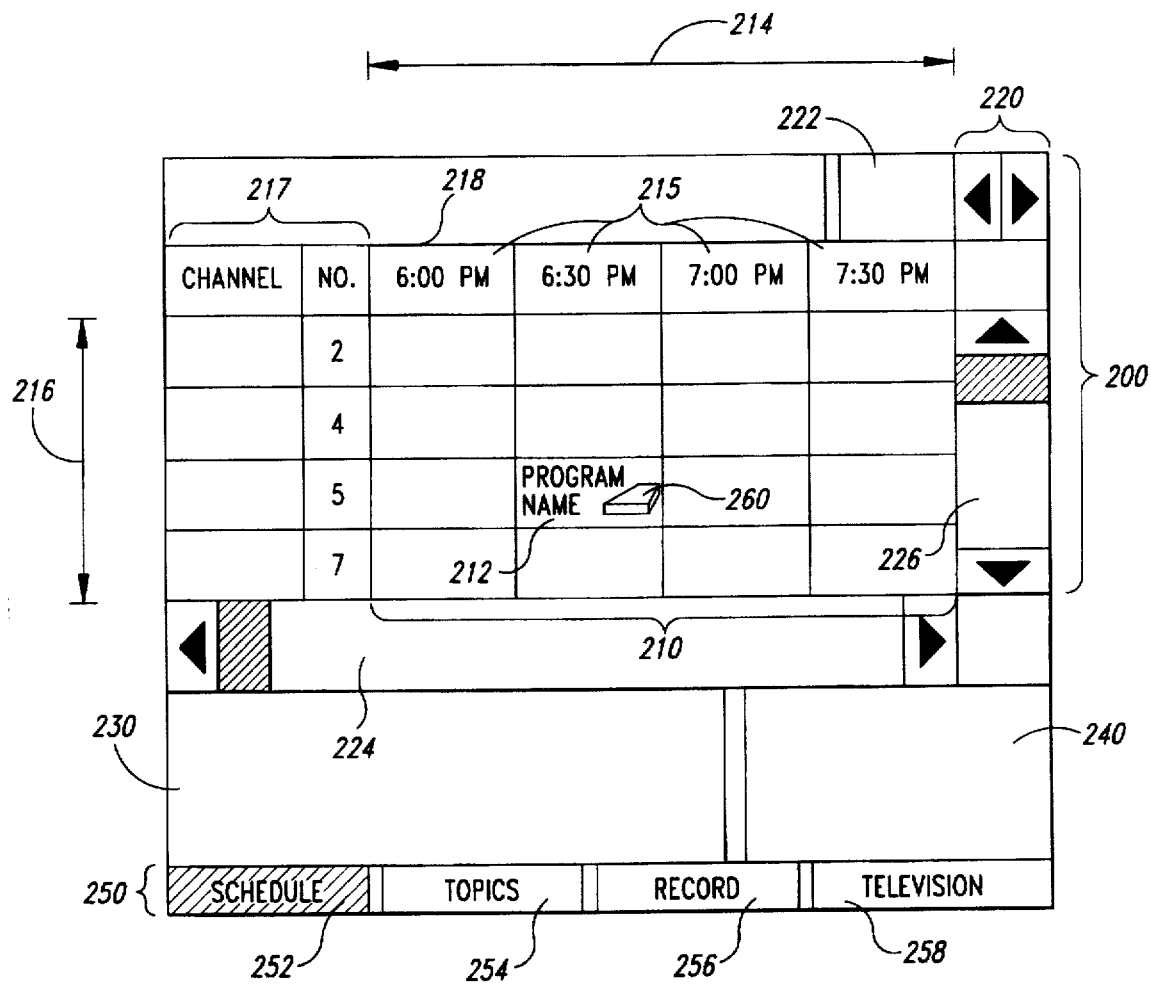
FIG. 2 is an illustration of the screen display displayed in accordance with the preferred embodiment.

A screen display is shown in FIG. 2 which is displayed by the television 130 under control of the selection program 152 when the user requests a schedule. The screen display includes a schedule layout 200 which displays the program name, channel indicator, and time of broadcast of each of the television programs. The schedule layout 200 includes a grid 210 in which a grid entry 212 is provided for each of a number of television programs broadcast by the cable source 110. Each grid entry 212 contains the program name of one of the television programs. The grid entries 212 are arranged horizontally according to a time of broadcast and arranged vertically according to the channel over which the television programs are broadcast. In an alternate embodiment, the grid entries 212 may be arranged vertically according to the time of broadcast and horizontally according to the channel. A number of time entries 215 are provided along a horizontal time axis 214 which display the different times over which the television programs are broadcast. Similarly, a number of channel entries 217 are provided along a vertical channel axis 216 which display the different channels over which the television programs are broadcast.

In the embodiment of the invention having the screen display shown in FIG. 2, the selection program 152, via the graphics display generator 157, controls the television 130 to display only a portion of the grid 210 at a given time. Thus, the grid 210 can contain a large number of times and channels over which the television programs are broadcast without the need to reduce each grid entry 212 to a size in which the program name becomes unreadable in order to display all television programs at the same time. It will be appreciated by one of ordinary skill in the art that the schedule layout 200 can be designed such that the size of the displayed portion of the grid 210 can be varied.

In an alternative embodiment, the channel entries 217 are arranged along the channel axis 216 according to a frequency with which channel entries associated with the program names have been designated by the user. Each time the user designates one of the program names, the selection program 152 increments a channel counter 151 for the channel entry 217 associated with the designated program name. The channel counter 151 is preferably stored in the RAM portion of the memory 150. The selection program 152, via the graphics display generator 157, controls the television 130 to arrange the channel entries 217 in an order of use from the channel entry with the highest value in its associated channel counter 151 to the channel entry with the lowest value in its associated channel counter 151. FIG. 2 illustrates a state of the schedule layout 200 wherein the order of use for the channel entries 217 is channels 2,4,5, and 7.

In yet another embodiment, the channel entries can be arranged along the channel axis 216 according to a frequency with which program names have been designated by the user. Each time the user designates one of the program names, the selection program 152 increments a program counter 153 associated with the designated program name. The program counter 153 is preferably stored in the RAM portion of the memory 150. The selection program 152, via the graphics display generator 157, then controls the television 130 to arrange the channel entries 217 in an order of use from the channel entry whose program name has been designated the most number of times, to the channel entry whose program name has been designated the least number of times. FIG. 2 illustrates a state of the schedule layout 200 wherein the program name designated the most number of times is associated with channel 2, for the currently displayed channel entries. The program name designated the least number of times is associated with channel 7, for the currently displayed channel entries. There may be more frequently displayed program names above channel 2 and less frequently displayed program names below channel 7 since the schedule 200 scrolls (the scroll feature is described in more detail below).

While the discussion above has focused on arranging channel entries 217 based on the frequency with which associated program names have been designated, those of ordinary skill will understand that other attributes or selection patterns can be monitored and the channel entries rearranged based on the results of that monitoring.

The schedule layout 200 also includes a day selector 220 with which the user selects the day for which the television programs are to be displayed by the grid 210. The day selector 220 contains arrow buttons with which the user moves the selected day chronologically forward or backward, as shown. The schedule layout 200 also includes a day entry 222 which indicates the day previously selected by the user via the day selector 220 and for which the television programs are displayed by the grid 210. The grid 210 varies in content based on the day currently selected.

The schedule layout 200 includes a time scroll bar 224 which the user scrolls to select time entries 215 that are different than the time entries currently displayed on the time axis 214 of the grid 210. Program names corresponding to the newly selected time entries 215 and the previously selected channel entries 217 are displayed in the grid entries 212. For example, the time scroll bar 224 is scrolled so that the time entries for the times 6:00 PM, 6:30 PM, 7:00 PM and 7:30 PM are selected, as shown in FIG. 2. Similarly, the schedule layout 200 provides a channel scroll bar 226 which the user scrolls to select channel entries 217 that are different than the channel entries currently displayed on the grid 210. Program names corresponding to the newly selected channel entries 217 and the previously selected time entries 215 are displayed in the grid entries 212. For example, the channel scroll bar 226 is manipulated so that the channel entries 217 for channels 2, 4, 5 and 7 are selected, as shown in FIG. 2. Thus, by manipulating the time scroll bar 224 and the channel scroll bar 226, the user varies the content of the displayed portion of the grid 210 shown in the schedule layout 200. In an alternate embodiment, the contents of the grid may be manipulated by directional buttons provided on the input device 120.

The present invention displays a description of the television program selected from the schedule layout 200 concurrently with the schedule layout. As shown in FIG. 2, the screen display contains a text display window 230 and a picture-in-graphics display window 240. The text display window 230 is provided in a location on the screen display that is separate from the schedule layout 200. The text display window 230 displays, concurrently with the schedule layout 200, a text string which describes the currently selected program from the grid 210.

The picture-in-graphics display window 240 is also provided in a location separate from the schedule layout 200. The picture-in-graphics display window 240 contains a graphic representation of the television program currently selected from the grid 210. When the currently selected program is actually being broadcast, the selection program 152 instructs the tuner 115 and the picture-in-graphics processor 155 to display a reduced-size video display of the selected program in the picture-in-graphics display window 240. It is well known to those skilled in the art how to provide such a reduced-size display on the screen display of a television. When the currently selected program is not being broadcast, the selection program 152, via the picture-in-graphics processor 155, controls the television 130 to display in the picture-in-graphics display window 240 a blank window, or, alternatively, a bitmap representing the selected program or the network logo or a network provided program video clip. The bitmap is provided by the cable source 110 and stored by the selection program 152 as part of the program information in the RAM portion of the memory 150.

Both a text description and a graphic representation of the selected program are preferably displayed when a television program is selected by the user in the preferred embodiment of the invention. When the user changes among selected programs by designating different entries 212 in the grid 210, the selection program 152, via the graphics display generator 157, concurrently changes the text description displayed in the text display window 230 and the graphic representation in the picture-in-graphics display window 240 of the selected programs so as to correspond to the newly selected program. As a result, the user is consistently provided with useful descriptions of the television programs that the user has selected for consideration, and these descriptions are provided concurrently with the schedule layout from which the user selects television programs.

The screen display also includes a display menu 250 which contains a schedule button 252, a topics button 254, a record button 256, and a television button 258. The display menu 250 is displayed at various stages of operation of the computer system. These stages of operation include the selection of programs from the schedule layout 200, display of a selected program, and selection of programs from a topic screen. When the schedule button 252 is selected, the selection program 152, via the picture-in-graphics processor 155, controls the television 130 to display the screen display of FIG. 2 and obtains user selection of the television programs from the schedule layout 200. FIG. 2 shows a state of the screen display after the schedule button 252 has been selected. Thus, the schedule button is shown deactivated. When the topics button 254 is selected, the selection program 152, via the picture-in-graphics processor 155, controls the television 130 to display a topic screen in place of the screen display.

When the user selects the record button 256, the selection program 152 designates the currently selected television program to be recorded by the video recorder 140. A graphic image can be inserted onto the video tape, just prior to the position where the television program is to be recorded, to indicate the date, length, and time of recording of the television program. This graphic image makes it easier to locate the recorded television program on the video tape. Similarly, a graphic image can be placed at the end of the video tape to indicate the end of the television program. This makes it easier to find the end of the television program. The selection program 152, via the graphics display generator 157, displays a record icon 260 next to the program name in the grid entry 212 for the selected television program. When the designated program is thereafter broadcast, the record program 154 records the designated program. When the television button 258 is selected, the selection program 152, via the tuner 115 and the picture-in-graphics processor 155, controls the television 130 to display the selected television program.

The present invention stores the program information necessary to provide the screen display to the television 130. The selection program 152 stores in the memory 150 the program information in a program table 300 shown in FIG. 3. The program table 300 includes a program entry 310 for each television program represented by one of the grid entries 212 of the screen display. Each program entry 310 includes a name field 320 which contains the program name for each television program. Each program entry 310 also includes the time of broadcast of each program. The stored time of broadcast comprises a day, a start time, and a length of the broadcast. Each program entry 310 further includes a day field 322 which stores an indication of the day of the broadcast, a start time field 324 which contains an indication of the start time of the broadcast, and a length field 326 which contains an indication of the length of the broadcast.

Figure 3:
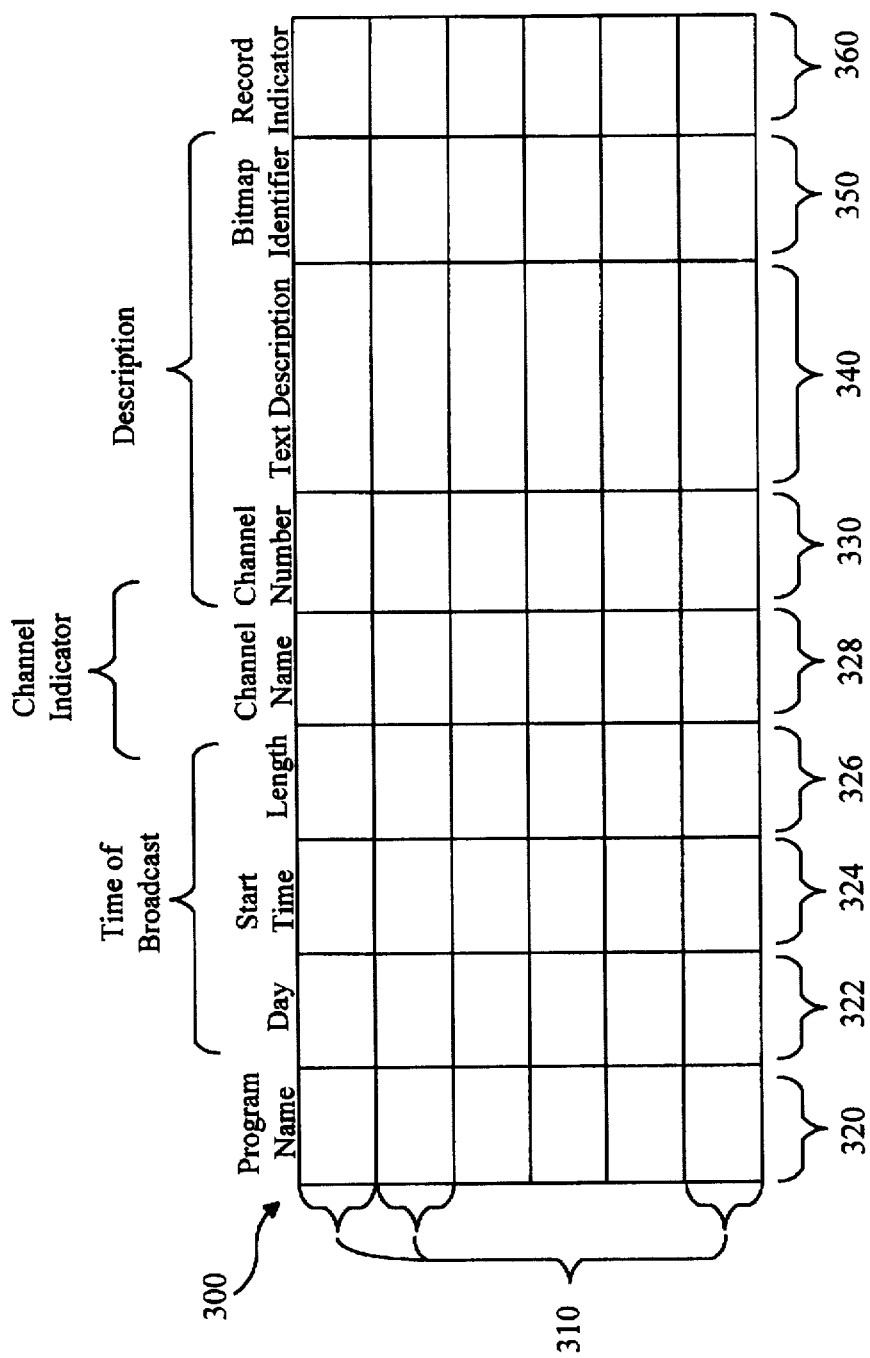
FIG. 3 is an illustration of the program table which stores program information in the preferred embodiment.

The selection program 152 also stores a channel indicator in the program table 300 in the memory 150. Each program entry 310 includes a channel name field 328 which stores the channel name of the channel over which the corresponding television program is broadcast. Each program entry 310 also includes a channel number field 330 which stores the channel number of the channel over which the corresponding television program is broadcast. For ease of description, the channel name is shown in FIG. 3 stored in the program table 300. In an alternate embodiment, however, each channel name is stored in a separate table together with each channel number so that the channel name does not have to be repeated each time a program is provided on a same channel.

The computer system stores a description of each television program. The selection program 152 stores the description in the program table 300 in the memory 150. The description can be stored in a compressed format. Each program entry 310 includes a description field 340 which contains the text string describing the television program, and a bitmap identifier field 350 which contains the bitmap identifier.

Finally, when the user makes a request to record a selected program, the selection program 152 designates the selected television program to be recorded upon reaching the broadcast time of the program. The selection program 152 stores a record indicator for the selected program in the program table 300, indicating that the selected program is to be recorded. Each program entry 310 includes a record indicator field 360 which stores the record indicator. For example, the record indicator is a flag having a value of '1' (indicating "TRUE") if the corresponding program is to be recorded and a value of '0' otherwise (indicating "FALSE"). In an alternative embodiment, a separate table is created with entries only for programs designated to be recorded. Each entry in the separate table contains a pointer to the program entry 310 for the program designated, and a recording flag which indicates whether the program is currently being recorded.

Flow Diagrams

Figure 4:
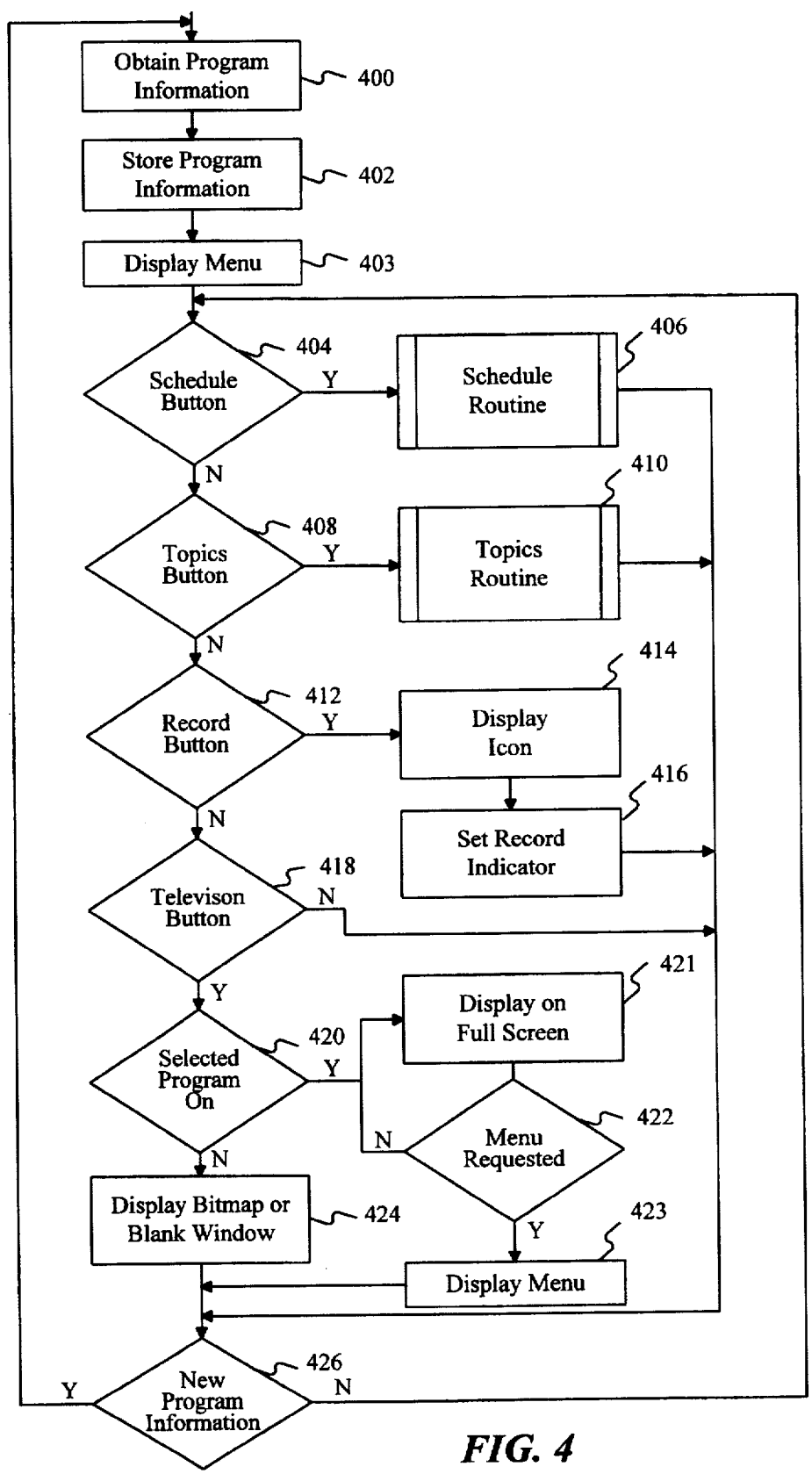
FIG. 4 is a flow diagram of the selection program performed by the preferred embodiment.

A flow diagram of the selection program 152 which provides the user with selection of television programs is shown in FIG. 4. As explained above with reference to FIG. 1, the selection program 152 is stored in the memory 150 and performed by the CPU 170 of the computer 100. It should be understood that, in interrupt driven systems, the user input-based steps shown in FIG. 4 and other flowcharts may not be performed in the exact order shown in FIG. 4, but are rather performed at the time of user input as indicated by an appropriate interrupt. Such steps are shown sequentially, however, for ease of explanation. In step 400, the selection program initially obtains the program information from the cable source 110 as described above. In step 402, the selection program stores the obtained program information into the program table 300. In an alternative embodiment, where the speed of the underlying system allows, the program information resides at the cable source 110 and is obtained as needed by the computer 100 in real time. The selection program 152 then continually responds to input from the user via the display menu 250.

In step 403, the selection program initially displays the display menu 250. In step 404, the selection program 152 determines whether the user has selected the schedule button 252 from the display menu 250. If so, the selection program 152 performs a schedule routine in step 406 which displays the schedule layout 200 and obtains user input based on the displayed schedule layout 200. When the schedule routine returns, control of the selection program 152 branches to step 426.

If the user has not selected the schedule button 252, then control proceeds to step 408. In step 408, the selection program determines whether the user has selected the topics button 254 from the display menu 250. If so, the selection program 152 performs a topics routine in step 410. The topics routine obtains a topic selection from the user indicating a category of television programs and then obtains a television program selected from the indicated category. When the topics routine returns, control branches to step 426.

If the user has not selected the topics button in step 408, then control proceeds to step 412. In step 412, if the user has selected the record button 256 from the display menu 250, then step 414 is performed. In step 414, the selection program 152 displays the record icon 260 in the schedule layout 200. Control then proceeds to step 416, wherein the selection program 152 sets a record indicator indicating that the selected program is to be recorded. After performing step 416, control then branches to step 426.

If the user has not selected the record button 256 in step 412, control proceeds to step 418. In step 418, the selection program determines whether the user has selected the television button 258 from the display menu 250. If not, control branches to step 426. If the user has selected the television button 258, then control proceeds to step 420. In step 420, if the selected television program is currently being broadcast (i.e., it is "ON"), then control proceeds to step 421. In step 421, the selection program 152, via the input/output device 160, controls the tuner 115 to display the currently selected program for viewing on the entire screen of the television. The selected program remains displayed until the user changes channels or requests the display menu 250 to make another selection. When the user changes channels, the text description stored in the text description field of the program entry 310 for the program provided on the new channel is optionally displayed, along with the program name, the channel name and channel number in the same program entry 310. If, in step 422, the user requests the display menu 250, then control proceeds to step 423, wherein the selection program displays the display menu. Otherwise, control loops to step 421 and the program continues to be displayed. After step 423 is performed, control proceeds to step 426.

If the selection program 152 determines in step 420 that the currently selected program is not currently being broadcast (i.e., not "ON"), then control proceeds to step 424. In step 424, the selection program 152, via the graphics display generator 157, controls the television 130 to display the text string in the text description field 340. The selection program 152, via the graphics display generator 157, also controls the television 130 to display in the picture-in-graphics display window 240, the bitmap identified in the bitmap identifier field 350 of the selected program (if the bitmap exists), or a blank window (if the bitmap does not exist). After performing step 424, control proceeds to step 426, wherein it is determined whether new program information has been received from the cable source 110. If so, control loops back to step 400, wherein the selection program obtains the new program information. Otherwise, control loops back to step 404, and the selection program 152 continues to respond to user input via the display menu 250.

Figure 5:
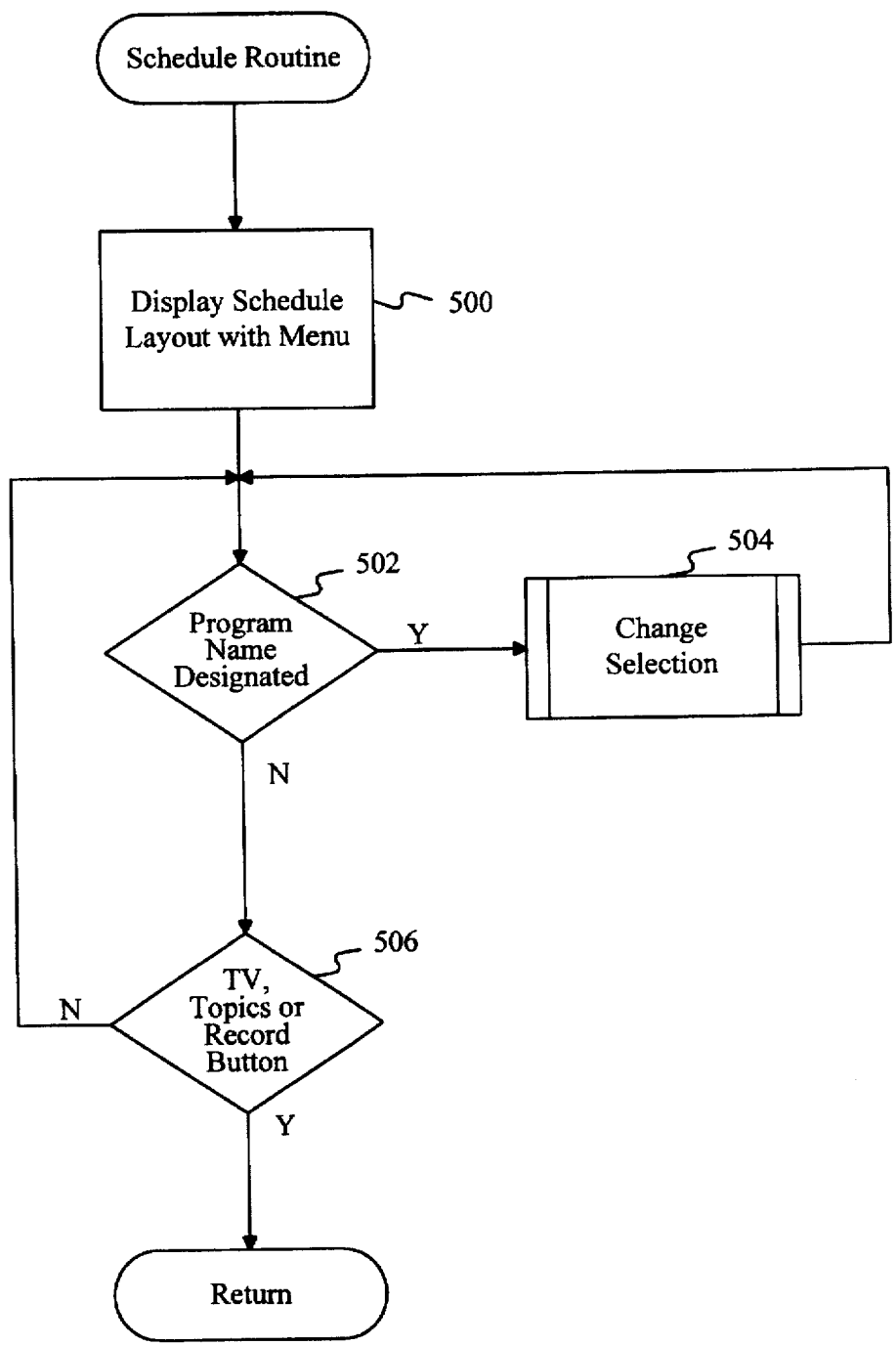
FIG. 5 is a flow diagram of the schedule routine performed by the selection program of FIG. 4.

When the user selects the schedule button 252 of the display menu 250, a schedule routine is performed. FIG. 5 is a flow diagram of the schedule routine performed in step 406 of the selection program 152. In step 500, the schedule routine displays the schedule layout 200 on the television 130. In a particularly preferred embodiment, the channel entries 217 and corresponding grid entries 212 are displayed in an order based on a number of times a television program or a channel has been selected. That is, the channel entries 217 and grid entries 212 corresponding to the channels selected most frequently at a particular time, are displayed highest in the grid 210. This method or ordering is described in more detail with respect to the description of topic selection in FIG. 7. In step 502, the schedule routine determines whether the user has designated a program name in a grid entry 212 of the schedule layout 200 using the input device 120 to scroll the time scroll bar 224 and channel scroll bar 226, as necessary, and selected a grid entry 212 having the program name. If so, then control proceeds to step 504. In step 504, a change selection routine is performed. The change selection routine displays the description of the newly selected program.

If the user does not designate the program name in step 502, then control proceeds to step 506. In step 506, the schedule routine determines whether the user has selected the topics button 254, the record button 256 or the television button 258 from the display menu 250. If so, the schedule routine returns to the selection program 152, which responds to the selection of the topics button 254, the record button 256 or the television button 258 in the manner described above. If the schedule routine determines in step 506 that the user has not selected one of these buttons, then control loops back to step 502, and the schedule routine continues to check for user input.

Figure 6:
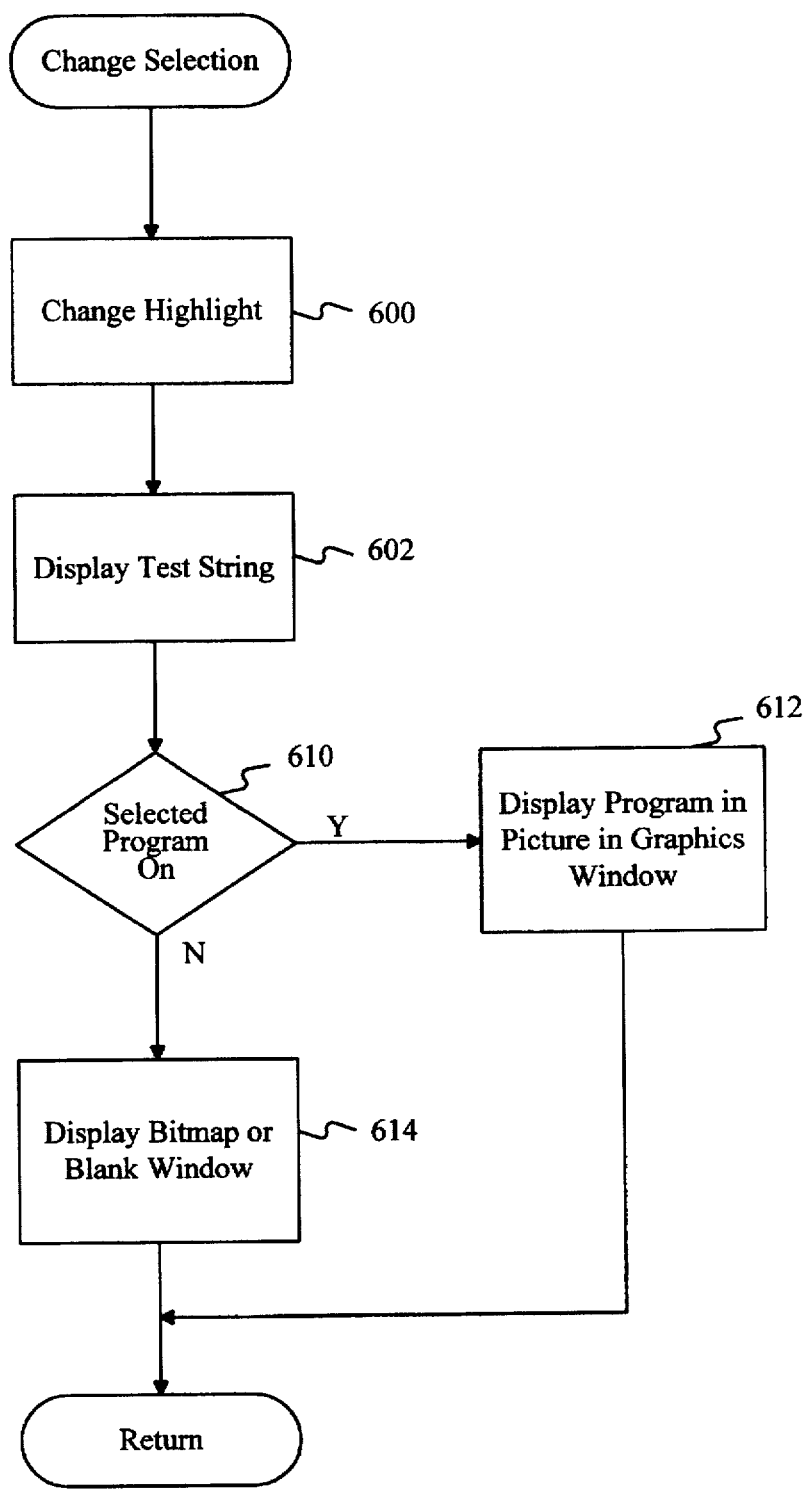
FIG. 6 is a flow diagram of the change selection routine performed by the schedule routine of FIG. 5 and the topics routine of FIG. 7.

When the user designates a program name in a grid entry 212 of the schedule layout 200, the selected program is changed. FIG. 6 is a flow diagram of the change selection routine which changes the selected program. In step 600, the change selection routine highlights the selected television program and removes any highlighting from a previously selected program. For example, the change selection routine displays the selected grid entry 212 with an increased brightness or in reverse video. Control then proceeds to step 602. In step 602, the change selection routine displays in the text display window 230 of FIG. 2 the text string which corresponds to the program name selected.

The computer system also provides a picture-in-graphics display window 240 in the screen display shown in FIG. 2. The change selection program displays a graphic image in the picture-in-graphic display window 240 which corresponds to the newly selected program. In step 610, if the newly selected program is currently being broadcast (i.e., it is ON), then the change selection routine performs step 612. In step 612, the change selection routine controls the tuner 115 to display the newly selected program on the television 130 in the picture-in-graphics display window 240. If the change selection routine determines in step 610 that the selected program is not currently being broadcast, then the change selection routine performs step 614. In step 614 the change selection routine displays in the picture-in-graphics display window 240 a bitmap identified by the bitmap identifier 350 of the Program entry 310 for the selected program, if the bitmap exists, or a blank window, if the bitmap does not exist.

Figure 7:
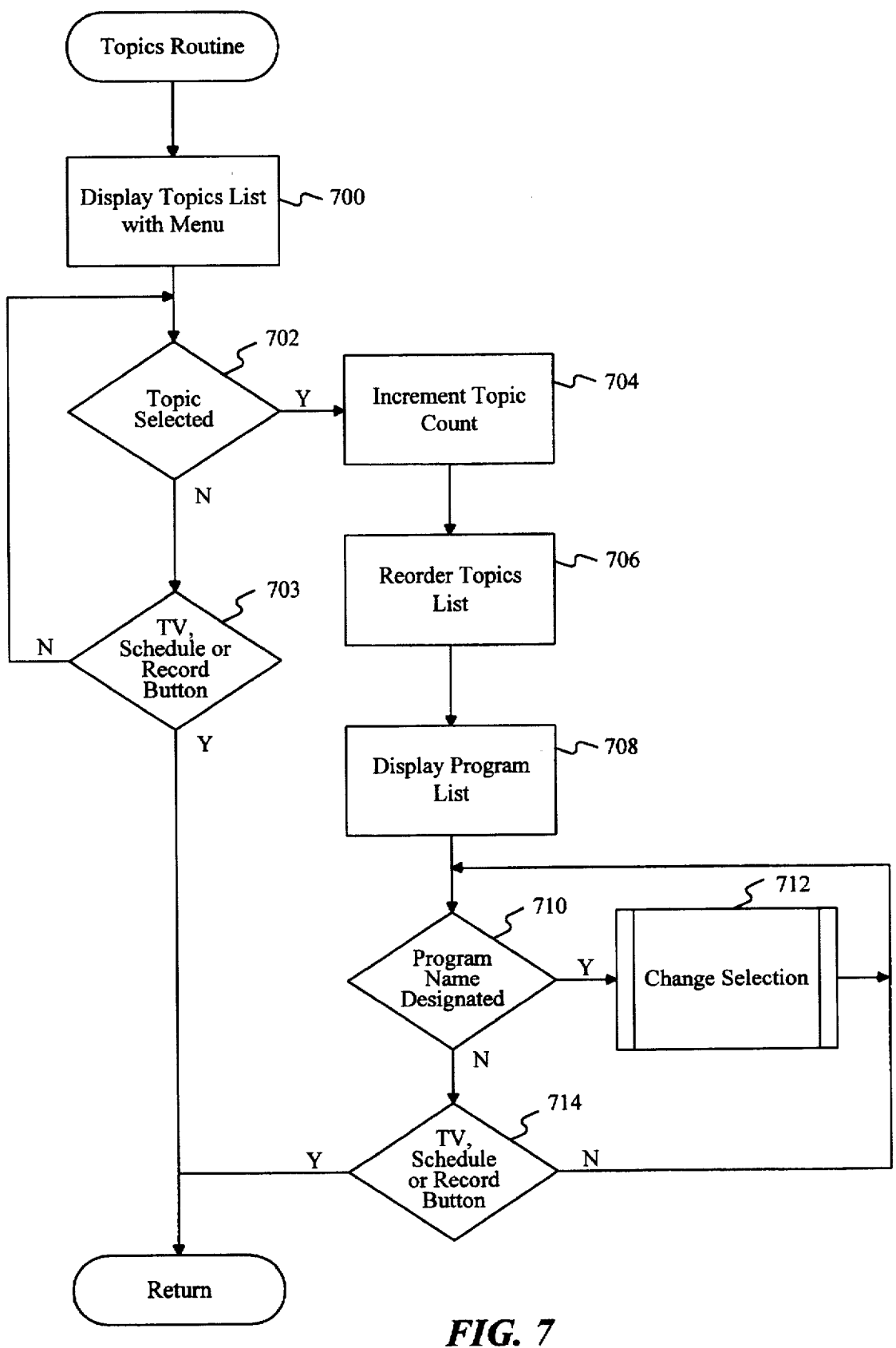
FIG. 7 is a flow diagram of the topics routine performed by the selection program of FIG. 4.

When the user selects the topics button 254 from the display menu 250, then a topics routine is performed. A flow diagram of the topics routine is shown in FIG. 7. In step 700, the topics routine displays a topics list or a set of topic images (e.g., icons) which contains a number of topics from which the user can select a television program definable within a particular category, such as 'sports', 'movies', and the like. The topics routine displays the topic list on the screen display shown in FIG. 2 in place of the schedule layout 200. The topic list is provided by the cable source 110. The topics routine displays the topic list concurrently with the text window 230, picture-in-graphics window 240 and display menu 250. In step 702, the topics routine determines whether the user has selected a topic from the displayed topic list using the input device 120. If the user has not selected a topic, control proceeds to step 703, wherein the topic routine determines whether the user has selected the schedule button 252, record button 256 or the television button 258. If so, the topics routine returns. If not, control loops back to step 702, and the topic routine continues to check for user selections.

If, in step 702, the user does select a topic from the topic list displayed, then control proceeds to step 704. In steps 704 through 714, the topics routine responds to user selection of a television program categorized according to the selected topic. In step 704, the topics routine increments a topic count stored in the memory 150 of the computer 100. The topic count indicates the total number of times that the particular topic selected by the user has been selected in the past. Control then proceeds to step 706 wherein the topics routine updates the order in which the topics are displayed in the topic list in step 700 according to the number of items selected. That is, the most frequently selected topic is displayed first, the second most frequently selected topic is displayed second, and so on. Control then proceeds to step 708. Thus, the next time the topics routine is performed, the updated order of the topics will be reflected. One of ordinary skill in the art will recognize various well-known techniques for maintaining and updating the order in which the topics list is displayed. One or ordinary skill will also recognize that the adaptively learned order of display described above can be applied not only based on the frequency of topics selected, but also based on the frequency of each network, show, actor, director, etc., selected. Also, the adaptively learned ordering described can be applied to the order in which the grid entries 212 are displayed in the schedule layout of FIG. 2.

The topics routine displays in step 708 a program list which lists the program names of all of the television programs defined by the topic selected by the user in step 702. If the topics routine determines in step 710 that a program name has been designated by the user from the displayed program list using the input device 120, then control proceeds to step 712 wherein the change selection routine is performed. The change selection routine has been described with reference to FIG. 6. Control then loops to repeat step 710. If the topics routine determines in step 710 that a program name has not been designated, then control proceeds to step 714. The topics routine determines in step 714 whether the topics button 254, the record button 256, or the television button 258 has been selected from the display menu 250. If so, the topics routine returns to the selection program 152, which responds to the selection. Otherwise, control loops back to step 710 and the topics routine continues to check for user selection of a program menu from the program list.

Figure 8:
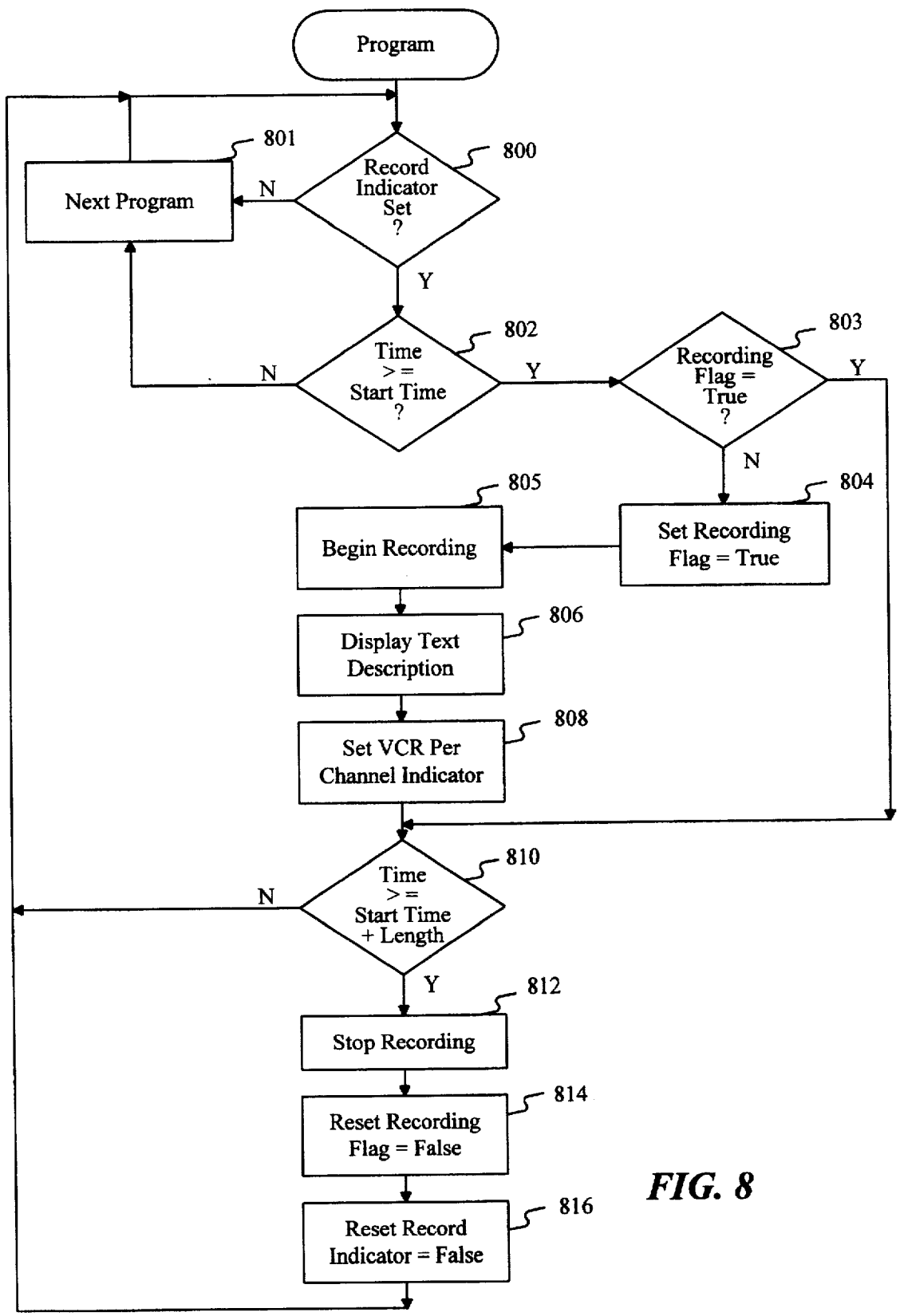
FIG. 8 is a flow diagram of the record program of the preferred embodiment.

The present invention provides a user with the ability to select a television program to be recorded. FIG. 8 is a flow diagram of the record program 154 which is stored in the memory 150 of the computer 100. The record program 154 is performed by the CPU 170 and responds to television programs that have been set to be recorded when the broadcast times of the television programs are reached. The CPU 170 of FIG. 1 is preferably a microprocessor which performs multitasking. As such, the CPU 170 performs the selection program 152 and the record program 154 concurrently. Alternatively, the selection program 152 and the record program 154 may be executed sequentially within a single loop. In step 800, the record program determines whether a record indicator has been set that is contained in the record indicator field 360 of a program entry 310 in the program table 300. If not, control branches to step 801 to obtain a next program entry 310 in the program table 300 and then loops to repeat step 800 for the next program entry. The record program 154 continues to check the record indicator in the record indicator field 360 of each program entry 310 until a record indicator is found that has been set. When a record indicator has been found that has been set, control proceeds to step 802. In the alternate embodiment explained above where programs to be recorded are indicated by an entry in a separate table instead of by the record indicator, each next entry in the separate table is retrieved and control then proceeds to step 802.

In step 802 it is determined whether the current time as indicated by the CPU 170 has reached or surpassed the start time of the television program having the set record indicator (or, in the alternative embodiment explained above, the television program indicated in the separate table). As explained above, the start time of a television program is stored in the start time field 324 of the program entry 310 for that television program. If the start time obtained has not been reached or surpassed, control branches to step 801 to obtain a next program entry 310 and then loops to again perform step 800 for the next television program by checking the record indicator in the record indicator field 360 of the next program entry 310.

If the record program 154 determines in step 802 that the current time has reached the start time of the television program to be recorded, then control proceeds to step 803. In step 803 the record program 154 determines whether a recording flag stored in the memory 150 has been set to TRUE indicating that a television program is already being recorded. If so, processing continues with step 810. In an alternative embodiment, a choice is obtained from the user as to whether to continue recording the same program, in which case control passes to step 810, or to record the new program, in which case control proceeds to step 804. Returning to the discussion of step 803, if the record program 154 determines that the recording flag is set to FALSE, then control proceeds to step 804 wherein the recording flag is set to be TRUE. Control then proceeds to step 805. In step 805, the record program provides a command via the input/output device 160 to the video recorder 140 to begin recording. In the preferred embodiment, the command is an infrared command. In step 806, the record program 154 provides a graphic image of the text string which describes the program to be recorded to the video recorder 140 as an input video signal. The record program obtains the text string from the text description field 340 of the program entry 310 for the program to be recorded. The record program provides the text string to the video recorder 140 to be displayed by the television 130 for a brief time (e.g., 10 seconds) and then proceeds to step 808. The graphic image of the text string makes it easier for users to locate the beginning of individual programs on the video tape and to discover what programs are recorded on the video tape.

In step 808, the record program 154 provides the channel of the program to be recorded to the video recorder 140 so that the video recorder 140 records the television program broadcast over that channel. Control then proceeds to step 810, where the record program determines whether the current time has reached the end time (the start time plus the length) of the television program being recorded. The record program obtains the start time from the start time field 324 and the length from the length field 326 of the program entry 310 provided for the television program being recorded. When the current time has reached the end time of the television program, then control proceeds to step 812, wherein the record program sends a command via the input/output device 160 to the video recorder 140 to stop recording. The command is preferably an infrared command. Then, in step 814, the recording flag is reset to FALSE. In step 816, the record program 154 resets the record indicator in the record indicator field 360 to the value FALSE. Control then loops back to step 800, where the record program continues to check for the next television program to be recorded.

Although the present invention has been described with reference to one or more specific embodiments, it should be appreciated that various changes can be made by one of ordinary skill in the art without departing from the spirit of the invention. The scope of the invention is properly defined by the claims.

We claim:

1. A method, performed by a computer, of obtaining from a user a selected program from among a plurality of television programs, the method comprising the steps of:

(a) storing, for each of the television programs, a program name, a time of broadcast, and textual and graphic descriptions of the television program;

(b) providing to a display device, for each of the television programs, the program name and the time of broadcast for display in a schedule layout which visually associates the program name with the time of broadcast;

(c) obtaining from the user a designation of the selected program; and (d) providing to the display device the textual description of the selected program and a graphic description of the selected program for concurrent display with the schedule layout in a separate location so that the textual and graphic descriptions do not overlay the displayed schedule layout.

2. The method of claim 1 wherein step (a) further comprises storing a channel indicator associated with the program name and the time of broadcast for each of the television programs, and step (b) comprises providing the channel indicator to the display device for display in the schedule layout so as to be visually associated with the program name and the time of broadcast.

3. The method of claim 2 wherein the schedule layout comprises a grid containing the program name of each of the television programs and having a channel axis which references the channel indicator associated with each of the television programs and a time axis which references the time of broadcast of each associated with the television programs.

4. The method of claim 3, further comprising:

for each channel indicator, determining the number of times that an attribute associated with the channel indicator has been designated by the user; and arranging the channel indicators on the channel axis in order from the channel indicator with the attribute designated the most number of times to the channel indicator with the attribute designated the least number of times.

5. The method of claim 3, further comprising:

for each channel indicator, determining the number of times that program names associated with the channel indicator have been designated by the user; and arranging the channel indicators on the channel axis in order from the channel indicator with the highest frequency of program names designated by the user to the channel indicator with the lowest frequency of program names designated by the user.

6. The method of claim 3, further comprising:

for each channel indicator, determining the number of times that a program name displayed on the time axis has been designated by the user; and arranging the channel indicators on the channel axis in order from the channel indicator with the program name designated the highest number of times to the channel indicator with the program name designated the lowest number of times.

7. The method of claim 1 wherein step (a) comprises storing a set of topics, each topic having one or more programs classified according to the topic, and wherein step (c) comprises obtaining a topic selected by the user, displaying a list of the television programs classified according to the selected topic and obtaining from the user a designated program from the program list as the selected program.

8. The method of claim 7 wherein step (c) further comprises providing the user with a list of topics and obtaining from the user a designated topic from the topic list as the selected topic, the list of topics being provided in an order corresponding to the number of times each of the topics has been previously selected.

9. The method of claim 7 wherein step (c) further comprises displaying the list of television programs classified according to the topic in an order based on program use criteria related to the topic.

10. The method of claim 7 wherein step (c) further comprises displaying the list of television programs classified according to the topic in an order based on the frequency of selection of television programs displayed on a same channel.

11. The method of claim 1, further comprising the steps of (e) obtaining from the user a request to view the selected program, and (f) displaying the requested program on a full screen of the display device.

12. The method of claim 11, further comprising the step of displaying program information superimposed on the display of the requested program when a channel is changed by the user to display the requested program.

13. The method of claim 12 wherein the program information includes the textual description of the requested program.

14. The method of claim 12 wherein the program information includes the program name of the requested program.

15. The method of claim 1, further comprising the steps of:

(e) obtaining from the user a request to record the selected program; and (f) providing an instruction to a recording device to record the selected program at the corresponding time of broadcast stored for the selected program in response to obtaining the request.

16. The method of claim 1, further comprising the steps of:

(e) obtaining from the user a request to record the selected program;

(f) providing an instruction to a recording device to record the selected program at the corresponding time stored for the selected program; and (g) providing an instruction to the recording device to record the textual description for a predetermined time just prior to performing the step (f) of providing the instruction to record the selected program.

17. The method of claim 1 wherein step (d) comprises providing to the display device a broadcast of the selected program in a picture-in-graphics display window for concurrent display with the schedule layout.

18. The method of claim 1 wherein the step (a) of storing comprises storing a bitmap describing the selected program and step (d) comprises providing the bitmap to the display device for concurrent display with the schedule layout.

19. A computer system for selecting and displaying a television program from among a plurality of television programs, comprising:

a display;

an input device through which the selected television program is selected from a user; and a computer coupled to the display and to the input device, comprising an input unit for obtaining the selected television program from the input device, a memory for storing a program name and a time of broadcast of each of the plurality of television programs, and a processor four obtaining the selected television program from the input unit, for reading the program name and time of broadcast for each of the plurality of television programs from the memory, for displaying on the display the read program names and times of broadcast, and, when the selected television program is currently being broadcast, for displaying the selected television program concurrently with the program name and time of broadcast of the plurality of television programs.

20. The computer system of claim 19, further comprising a video recorder coupled to the computer and coupled to the display, and wherein the processor controls the video recorder to record the selected television program upon obtaining from the input unit a request provided by the user via the input device to record the selected television program.

21. A method in a computer system for displaying television information about a plurality of television programs on a display device, the method comprising the steps of:

receiving the television information for each of the plurality of television programs, the television information include a name and a time of broadcast, and a graphics information or the television program;

for each of the plurality of television programs, displaying on the display device the name of the television program and an indication of the time of broadcast of the television program;

receiving from a user of the computer system a selection of a television program; and in response to receiving the selection, displaying on the display device the graphics information of the selected television program simultaneously with the displayed names and indications of time and channel of broadcast of the television programs.

22. The method of claim 21 including the step of in response to receiving the selection and when the selected television program is currently being broadcast, displaying the broadcast of the selected television program simultaneously with the displayed names and indications of the times of broadcast of the television programs.

23. The method of claims 22 wherein the step of displaying the broadcast includes the step of suppressing the displaying of the graphics information.

24. A method in a computer system for displaying television information about a plurality of television programs on a display device, the method comprising the steps of:

receiving the television information for each of the plurality of television programs, the television information include a name and a time of broadcast;

for each of the plurality of television programs, displaying on the display device the name of the television program and an indication of the time of broadcast of the television program;

receiving from a user of the computer system a selection of a television program; and in response to receiving the selection and when the selected television program is currently being broadcast, displaying the broadcast of the selected television program simultaneously with the displayed names and indications of the time of broadcast of the television programs.

25. A method in a computer system for displaying television information about a plurality of television programs on a television screen, the television information for each television program including a name and a time of broadcast, the method comprising:

for each of the plurality of television programs, displaying on the television screen the name of the television program and an indication of the time of broadcast of the television program;

receiving from a user of the computer system a selection of a television program whose information is currently displayed on the television screen; and in response to receiving the selection of the television program, determining whether the television program is currently being broadcast;

when it is determined that the selected television program is currently being broadcast, displaying the broadcast of the selected television program on the television screen simultaneously with the displayed names and indications of the time of broadcast of the television programs; and when it is determined that the selected television program is not currently being broadcast, displaying additional information about the television program on the television screen.

26. The method of claim 25, including:

when the broadcast of the selected television program is being displayed, receiving from the user of the computer system a selection of another television program whose information is simultaneously being displayed with the broadcast on the television screen; and in response to receiving the selection of the other television program, determining whether the other selected television program is currently being broadcast;

when it is determined that the other selected television program is currently being broadcast, displaying the broadcast of the other selected television program on the television screen simultaneously with the displayed names and indications of the time of broadcast of the television programs; and when it is determined that the other selected television program is not currently being broadcast, displaying additional information about the other television program on the television screen.

27. The method of claim 25 wherein the displayed broadcast of the selected television program does not overlap the displayed television program information so that the user can view both the displayed broadcast and the information.

28. The method of claim 25 wherein the additional information displayed when the selected television program is not being displayed is a graphical representation of the selected television program.

29. The method of claim 25 wherein the additional information is displayed simultaneously with the displayed names and indications of the time of broadcast of the television programs.

30. A computer-readable medium containing instructions for causing a computer system to display a schedule for a plurality of television programs on a television screen by:

displaying the schedule on the television screen;

receiving from a user of the computer system a selection of a television program from the displayed schedule; and in response to receiving the selection of the television program, determining whether the television program is currently being broadcast;

when it is determined that the selected television program is currently being broadcast, displaying the broadcast of the selected television program on the television screen simultaneously with the displayed schedule; and when it is determined that the selected television program is not currently being broadcast, displaying additional information about the television program on the television screen simultaneously with the displayed schedule.

31. The computer-readable medium of claim 30, including:

when the broadcast of the selected television program is being displayed, receiving from the user of the computer system a selection of another television program from the schedule that is simultaneously being displayed with the broadcast on the television screen; and in response to receiving the selection of the other television program, determining whether the other selected television program is currently being broadcast;

when it is determined that the other selected television program is currently being broadcast, displaying the broadcast of the other selected television program on the television screen simultaneously with the displayed schedule; and when it is determined that the other selected television program is not currently being broadcast, displaying additional information about the other television program on the television screen simultaneously with the displayed schedule.

32. The computer-readable medium of claim 30 wherein the displayed broadcast of the selected television program does not overlap the displayed schedule so that the user can view both the displayed broadcast and the schedule.

33. The computer-readable medium of claim 30 wherein the additional information displayed when the selected television program is not being displayed is a graphical representation of the selected television program.

34. The computer-readable medium of claim 30 wherein the additional information is displayed simultaneously with the displayed schedule.

* * * * *

UNITED STATES PATENT AND TRADEMARK OFFICE
CERTIFICATE OF CORRECTION

| | | |
|---|---|---|
| PATENT NO. | : 5,731,844 | Page 1 of 1 |
| APPLICATION NO. | : 08/713588 | |
| DATED | : March 24, 1998 | |
| INVENTOR(S) | : Adam C. Rauch et al. | |

It is certified that error appears in the above-identified patent and that said Letters Patent is hereby corrected as shown below:

In Title page, in Item (22), under "Filed" column 1, line 1, delete "Aug. 13, 1996" and insert -- Sep. 13, 1996 --, therefor.

In the Drawings

Sheet 1 of 8, Fig. 1, Reference Numeral 152, line 1, delete "Selected" and insert -- Selection --, therefor.

Sheet 4 of 8, Fig. 4, line 1, above

" 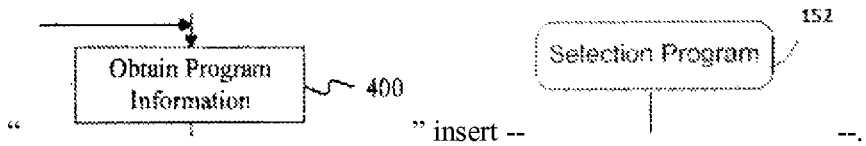 " insert -- --.

Sheet 8 of 8, Fig. 8, line 1, delete "Program" and insert -- Record Program --, therefor.

In the Claims

In column 16, line 20, in Claim 19, delete "four" and insert -- for --, therefor.

Signed and Sealed this
First Day of April, 2014

Michelle K. Lee
*Deputy Director of the United States Patent and Trademark Office*